(No Model.) 2 Sheets—Sheet 1.

G. B. ST. JOHN.
VEHICLE RUNNING GEAR.

No. 499,806. Patented June 20, 1893.

Attest:
W. H. Meyers
Frank G. Clark

Inventor:
Garland B. St. John,
By J. M. St. John,
Atty.

THE NORRIS PETERS CO., PHOTO-LITHO., WASHINGTON, D. C.

(No Model.) 2 Sheets—Sheet 2.

G. B. ST. JOHN.
VEHICLE RUNNING GEAR.

No. 499,806. Patented June 20, 1893.

UNITED STATES PATENT OFFICE.

GARLAND B. ST. JOHN, OF KALAMAZOO, MICHIGAN.

VEHICLE RUNNING-GEAR.

SPECIFICATION forming part of Letters Patent No. 499,806, dated June 20, 1893.

Application filed June 2, 1890. Serial No. 354,029. (No model.)

*To all whom it may concern:*

Be it known that I, GARLAND B. ST. JOHN, a citizen of the United States, residing at Kalamazoo, in the county of Kalamazoo and State of Michigan, have invented certain new and useful Improvements in Vehicle Running-Gear; and I do hereby declare the following to be a full, clear, and exact description of the invention, such as will enable others skilled in the art to which it appertains to make and use the same.

The object of my invention is to improve the construction of the running-gear of vehicles by the construction, combination and arrangement of devices hereinafter fully set forth and claimed.

Figure 1:
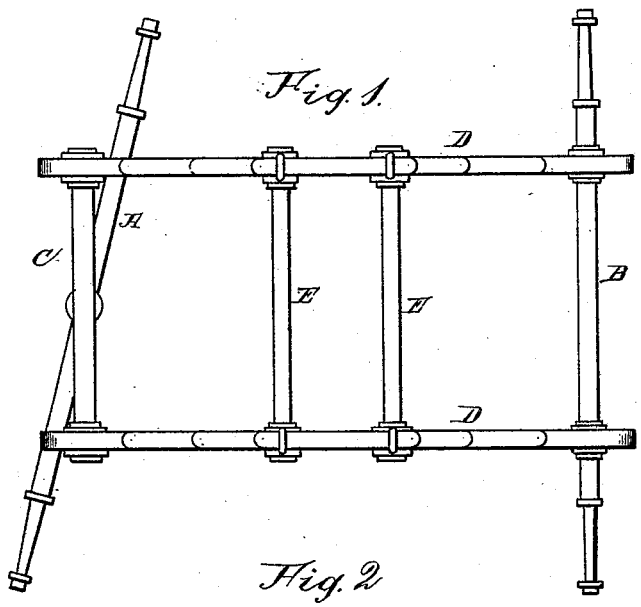
Figure 2:
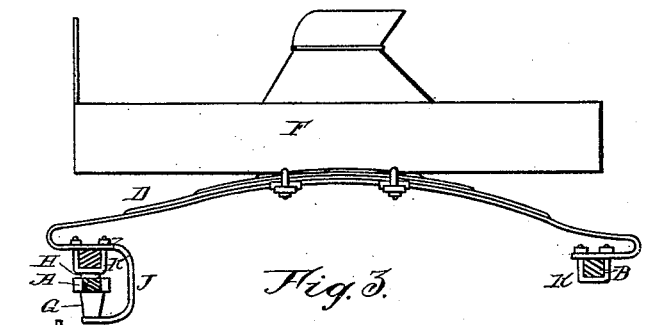
Figure 3:
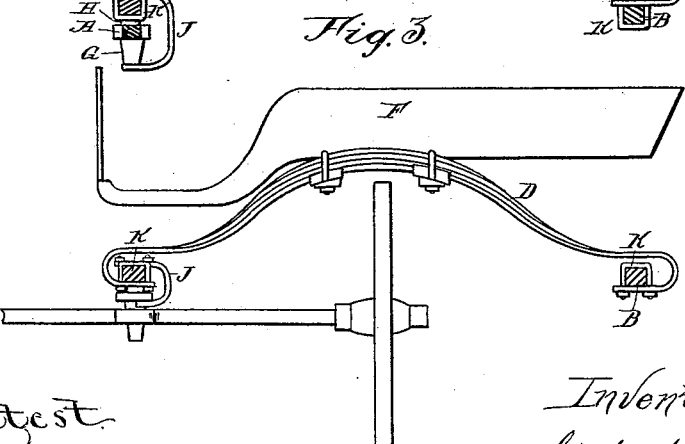
Figure 4:
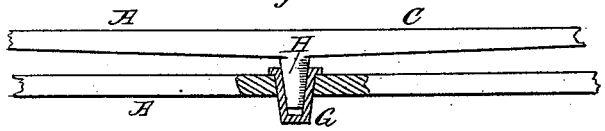
Figure 5:
Figure 6:
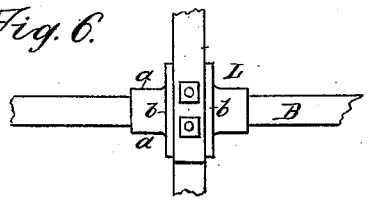
Figure 7:
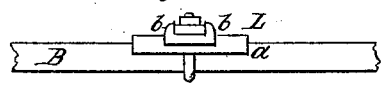
Figure 9:
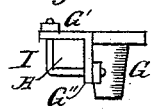
Figure 8:
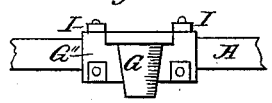

In the accompanying drawings, forming a part of this specification, Figure 1, Sheet 1, is a plan view of a running-gear embodying my invention. Fig. 2 is a side elevation of the same, partly in section, with the body attached, and Fig. 3 is a similar view of a modified form of spring and body, arched for the passage of the forward wheels under them.
Fig. 4, Sheet 2, is a fragmentary elevation of the forward axle and the cross-bar above, with the axle partly in section to show the construction of the coupling. Fig. 5 is a plan view of the middle portion of the forward axle. Fig. 6 is a fragmentary view of a spring and the rear axle, showing the manner of clamping them together. Fig. 7 is a rear elevation of the same. Fig. 8 is a rear elevation of a modified form of socket for the forward axle, and Fig. 9 is a side elevation of the same.

Similar letters of reference indicate corresponding parts.

The invention relates to vehicle gears in which the reach connection at the forward axle is a cone and socket instead of the common fifth-wheel, and more particularly to light spring carriages.

The principal features of the invention are certain improvements in the coupling, which will be hereinafter described. I have also illustrated several forms of spring reaches adapted to co-operate with said coupling, and when combined therewith form a simple, neat and comfortable vehicle-gear.

Referring to the drawings, A is the forward axle, and B the rear axle.

C is a cross-bar connecting pivotally with the forward axle.

D D are springs extending from the rear axle to the cross-bar, with both of which they connect.

E E are cross-bars clipped to the middle portions of the springs, and adapted to support the body F, suitably secured to them.

The connection of the cross-bar and the forward axle is by a device similar to that described in my former Letters Patent, No. 422,992, issued March 11, 1890, and the features thereof therein claimed are disclaimed herein.

The improvement herein which I desire to claim is in the construction of the forward axle and its connected socket G, and in a device for holding the pin or plug H in the socket. A simple mode of attaching the socket to the axle is to perforate the axle, and shrink the socket in the hole so formed. This construction is more specially applicable to the axles of heavy draft vehicles, in which the lightness and symmetry of the axle are not important considerations.

In Figs. 8 and 9 hereof, I have shown a construction which does not necessitate the perforating of the axle and is therefore applicable to the small axles of light vehicles, whether in general use, or made new with particular reference to this type of coupling. In this case the socket is provided with flanges G' and G" which fit over one corner of the axle, and are secured to it by an angular clip I. A further advantage arising from this construction is found in the fact that the pivot for the forward axle is thus shifted back of the axle, thereby permitting the vehicle to turn more shortly and on less ground than as ordinarily constructed. The pivot-pin H is herein shown as a constituent part of the cross-bar C. By this construction it will be seen that the body of the vehicle is held rigidly and prevented from tipping, as the conical socket is made of sufficient depth to sustain the conical or conoidal pivot pin laterally therein, thus performing the entire work of the upper half of the ordinary fifth-wheel, head-block and cross-bar. To this cross-bar is attached a stirrup J, one end of which passes under the socket, or a flange thereon, and thus holds the two parts in connection.

In practice I have found that while the form of coupling described in the Letters Patent hereinbefore referred to is well suited to the heavier vehicles, in which the weight of the body is all that is required to hold the cone in the socket, in the case of light vehicles adapted for fast driving I find it desirable to so connect the cone and socket as to prevent accidental disconnection of the parts by the natural jolt of the vehicle. This I accomplish by means of a stirrup or hook, substantially as shown and described, since the closing of the bottom of the socket to retain oil prevents any direct connection with the lower end of the cone, as by a burr or the like. In practice, however, I make this stirrup or hook as shown, that is to say, connected at one end only to the head-block or reach, the other end simply extending a short distance under the socket, or a flange thereon as shown in Fig. 3, which permits the wheel to turn clear under the body of the vehicle. Now as the only purpose of this hook is to prevent accidental displacement of the cone in ordinary driving, it is not essential that the hook should either extend entirely under or around the bottom of the socket or axle, or come into actual contact therewith, or be of very strong or rigid material. Indeed it may be made so light that in the event of overturning, the forward axle will twist out of its seat between the cone and the hook, thus liberating the part to which the horses are attached. This would of course break the hook, if of frail material, as cast iron, or bend it out of shape, if of malleable material, a matter of little practical importance as compared with the advantages secured by the construction.

The springs may be attached directly to the axle and cross-bar by clips K K, as shown in Figs. 2 and 3; but in practice I prefer to connect them with an interposed right-angle-block L, shown in Figs. 6 and 7. This angle-block has ribs or flanges $a$ fitting snugly against both sides of the axle or cross-bar, and ribs or flanges $b\ b$ fitting in the same manner the sides of the springs. The parts being now fastened together by a clip are held firmly and immovably at right angles to each other, so that any twisting of the spring with respect to the axle or cross-bar is prevented. These angle-blocks also tend to horizontalize the movement of the body, since the springs are firmly clamped in lateral alignment, and any depression of one side of the body more than the other serves to make the parts bind by reason of the elongation of the spring on that side. This of course arrests the depression of the body on that side, since the spring cannot be depressed and elongated without bending edgewise. That is to say, this side of the body can only be depressed by the extension or elongation of both springs, and this is effected by the longitudinal outward thrust of one or both.

With springs arched as shown in Fig. 3, the forward wheel may be turned directly under the body of the vehicle, for convenience in turning around, or getting into said vehicle, there being no reach or other obstruction to this action of the wheel. The convenience of this construction is specially apparent in the case of phaetons, and the like, such as are used more particularly by ladies, though the same is true of other styles. So far as I am aware no provision has hitherto been made in a single seated carriage for the turning of the forward wheels clear under the body. Consequently, in the case of single-seated family carriages used by ladies great danger arises from the sudden turning of the vehicle, the effect being the frequent upsetting of the carriage. So also difficulty is experienced in getting into the ordinary carriage without dragging and soiling the skirts on the wheels. Irrespective of these difficulties is the common inconvenience in turning the ordinary carriage in a narrow way. These disadvantages I seek to remove, and also the necessity for a reach, by the construction shown and described, the springs really serving in the capacity of a flexible, arched reach.

It is understood that the seat is to be mounted practically over the highest portions of the springs. This does not necessarily carry the occupant higher than in the ordinary carriage, since the body may be built lower in front of the seat, as indicated in Fig. 3, following to some extent, the curvature of the springs, and allowing a lower place for the feet without correspondingly elevating the seat.

Having thus described my invention, what I claim as new, and desire to secure by Letters Patent, is—

1. In a coupling for the running-gear of vehicles, the combination of the front and rear axles, a suitable connecting device extending from one to the other, a conical, oil-holding socket attached to the forward axle, a conical pivot-pin secured to the said gear connecting device, and adapted for engagement with said socket, and a stirrup or hook fastened at only one of its ends to said gear connection, the other end extending a short distance under some part of the socket, whereby the cone is held in place normally, but is not prevented from wrenching out of the socket in case the vehicle overturns.

2. In a vehicle gear coupling, the combination with the front and rear axles and suitable connecting means, of a conical oil-holding socket clipped to the back side of the front axle, a cone engaging said socket secured to the gear-connection and a stirrup or hook secured at one end only to said gear connection, the other end extending a short distance under some part of the socket, substantially as and for the purpose set forth.

In testimony whereof I affix my signature in presence of two witnesses.

GARLAND B. ST. JOHN.

Witnesses:
A. M. STEARNS,
H. G. COLMAN.